United States Patent [19]

Fujimoto et al.

[11] 4,379,039

[45] Apr. 5, 1983

[54] ULTRAVIOLET CURABLE RESIN COMPOSITION

[75] Inventors: Hiroshi Fujimoto, Shiga; Hideo Miyake, Otsu, both of Japan

[73] Assignee: Toyo Boseki Kabushiki Kaish, Japan

[21] Appl. No.: 219,568

[22] Filed: Dec. 24, 1980

[30] Foreign Application Priority Data

Dec. 29, 1979 [JP] Japan ................. 54-171820

[51] Int. Cl.$^3$ ............................................. C08G 63/04
[52] U.S. Cl. ..................... 204/159.15; 204/159.19; 525/44; 156/332; 427/54.1
[58] Field of Search ............... 204/159.15, 159.19; 525/35, 44

[56] References Cited

U.S. PATENT DOCUMENTS

| | | | |
|---|---|---|---|
| 3,558,309 | 1/1891 | Laridon et al. | 204/159.23 |
| 4,020,193 | 4/1977 | Wismer et al. | 204/159.15 |
| 4,110,187 | 8/1978 | Sloan et al. | 204/159.19 |

FOREIGN PATENT DOCUMENTS

| | | |
|---|---|---|
| 50-150504 | 9/1975 | Japan . |
| 53-37902 | 6/1978 | Japan . |
| 54-15691 | 4/1979 | Japan . |
| 54-15473 | 7/1979 | Japan . |

OTHER PUBLICATIONS

Chem. Abst. 73:78,650p, 1970.

*Primary Examiner*—Theodore Morris
*Attorney, Agent, or Firm*—Jones, Tullar & Cooper

[57] ABSTRACT

An ultraviolet curable resin composition comprising (I) a saturated copolyester having a molecular weight of 2,000 to 15,000 which is soluble in a polymerizable compound (II), 20% by mole or more of saturated polycarboxylic acid components of the saturated copolyester being an aromatic dicarboxylic acid, (II) a polymerizable compound, at least a part of which is a compound having two or more polymerizable double bonds in the molecule thereof, and (III) a photosensitizer.

The ultraviolet curable resin composition has excellent flexibility, adhesion and processability and is useful as an ink composition for screen printing and a transfer paper for decorating potteries and further as an adhesive for the preparation of laminated products.

22 Claims, No Drawings

ULTRAVIOLET CURABLE RESIN COMPOSITION

The present invention relates to an ultraviolet curable resin composition. More particularly, it relates to an ultraviolet curable composition composed of a saturated copolyester (I) having a molecular weight of 2,000 to 15,000 which is soluble in a polymerizable compound, a polymerizable compound (II) and a photosensitizer (III), said composition having excellent flexibility, adhesion and processability.

Recently, with social demands such as conservation of resources, inhibition of environmental pollution, safety, and the development of non-solvent type resins, the development ultraviolet curable resins has progressed rapidly. Hitherto various resins have been proposed suitable as a binder for ultraviolet curable inks, paints or coatings such as epoxyacrylates, urethane-modified acrylates, oligo ester acrylates, or the like (cf. Japanese Patent Publication Nos. 37902/1978, 15691/1979 and 15473/1979), but these resins have merely been used in a part of the paper or wooden product fields.

Although these prior ultraviolet curable inks, paints or coating agents have merits such as non-pollution, rapid curability and conservation or resources, use of them has not necessarily sufficiently progressed, because they are remarkably inferior to the conventional products in adhesion, flexibility and processability. Accordingly, it is necessary to improve the adhesion properties to various metals, plastics, films, coated metal plates, and further flexibility and processability thereof in order to expand the utilities of the ultraviolet curable resins.

However, there have never been found any ultraviolet curable resins having excellent adhesion, flexibility and processability, and hence, the improvement of adhesion is usually done by subjecting the base materials to be coated to specific and complicated pretreatment (cf. Japanese Patent Laid Open Application No. 150504/1975). Such a pretreatment of the base materials results in complication of process steps and also in increased cost of products. There is also proposed an ultraviolet curable polyester binder and coating composition comprising a specific polyester, an ethylenically unsaturated photopolymerizable compound and a photopolymerization initiator (cf. U.S. Pat. No. 4,110,187), but the materials used therein show inferior compatibility for each other and the composition is occasionally obtained in the form of a turbid solution or gel, shows low adhesion, and gives a cured coating layer having relatively poor strength.

Thus, there has never been found any ultraviolet curable resin having excellent adhesion, flexibility and processability, and the development of a resin having such excellent properties is desired.

As a result by intensive study of the present inventors, there has been found an ultraviolet curable resin composition, having excellent adhesion to various metals, plastics, films, coated metal plates and also flexibility and processability without any complicated pretreatment, by using a specific saturated copolyester which is soluble in a polymerizable compound.

An object of the present invention is to provide an ultraviolet curable resin composition having excellent adhesion, flexibility and processability. Another object of the invention is to provide an ultraviolet curable coating composition. A further object of the invention is to provide an ultraviolet curable ink composition suitable for screen printing. A further object of the invention is to provide a laminated product wherein the ultraviolet curable composition as set forth above is used as a binder. A still further object of the invention is to provide a transfer paper for decorating pottery. These and other objects and advantages of the present invention will be apparent to skilled persons in the art from the following description.

The ultraviolet curable resin composition of the present invention comprises (I) a saturated copolyester having a molecular weight of 2,000 to 15,000 which is soluble in a polymerizable compound (II), 20% by mole or more of saturated polycarboxylic acid component of the saturated copolyester being an aromatic dicarboxylic acid, (II) a polymerizable compound, at least a part of which is a compound having two or more polymerizable double bonds in the molecule, and (III) a photosensitizer.

The saturated copolymester (I) having a molecular weight of 2,000 to 15,000 which is soluble in a polymerizable compound (II) includes a polyester derived from a saturated polycarboxylic acid or its derivative and a polyvalent alcohol. Suitable examples of the saturated polycarboxylic acid are aromatic dicarboxylic acids, such as terephthalic acid, isophthalic acid, orthophthalic acid, 2,6-naphthalenedicarboxylic acid; aliphatic dicarboxylic acid, such as succinic acid, adipic acid, azelaic acid, sebacic acid, dodecanedionic acid; alicyclic dicarboxylic acids, such as 1,4-cyclohexanedicarboxylic acid, tetrehydrophthalic acid, hexahydrophthalic acid, chlorendic acid; or the like, which may be used alone or in combination of two or more kinds thereof. Suitable examples of the polyvalent alcohol are alkylene glycols, such as ethylene glycol, propylene glycol, 1,4-butanediol, 1,6-hexanediol, 1,5-pentanediol, neopentyl glycol; polyalkylene glycols, such as diethylene glycol, triethylene glycol, tetra- or more polyethylene glycols, dipropylene glycol, tri- or more polypropylene glycol; halogenated alkylene glycols such as dibromoneopentyl glycol; bisphenol A ethylene oxide and/or propylene oxide adduct; hydrogenated bisphenol A ethylene oxide and/or propylene oxide adduct; 1,4-cyclohexanedimethanol, or the like, which may be used alone or in combination of two or more kinds thereof. The saturated polycarboxylic acid components may also contain tri- or more polycarboxylic acids such as trimellitic acid, pyromellitic acid, and the polyvalent alcohol components may also contain tri- or more polyvalent alcohols such as trimethylolpropane, trimethylolethane, pentaerythritol. A small amount of a monocarboxylic acid or a monovalent alcohol may optionally be copolymerized.

The saturated copolyester (I) can be produced by any conventional process, such as an ester exchange process, or a direct esterification process, wherein a conventional catalyst such as tetra-n-butyl titanate or stannous oxalate may optionally be used.

The saturated copolyester (I) comprises as the polycarboxylic acid component 20% by mole or more of an aromatic dicarboxylic acid, particularly terephthalic acid and/or isophthalic acid. Particularly suitable polycarboxylic acid components of the saturated copolyester (I) comprise 19 to 98% by mole of terephthalic acid, 1 to 80% by mole of isophthalic acid and 80 to 1% by mole of an aliphatic dicaroxylic acid having 3 to 30 carbon atoms. Another suitable polycarboxylic acid components comprise 20 to 70% by mole of terephthalic acid and 80 to 30% by mole of isophthalic acid, or comprise 20 to 70% by mole of terephthalic acid and 80 to 30% by mole of an aliphatic dicarboxylic acid having 3 to 30 carbon atoms. Suitable polyol components of the saturated copolyester (I) comprise 10 to 80% by mole of ethylene glycol and 90 to 20% by mole of an alkylene glycol selected from propylene glycol, butanediol, neopentyl glycol and hexanediol, or comprise 10 to 90% by mole of butanediol and 90 to 10% by mole of an alkylene glycol selected from propylene glycol, neopentyl glycol and hexanediol.

The saturated copolyester (I) may optionally be copolymerized with 0.5 to 20% by mole of an aromatic dicarboxylic acid having a metal sulfonate group, i.e. metal salts of sulfo-aromatic dicarboxylic acids, such as sulfoterephthalic acid, 5-sulfoisophthalic acid, 4-sulfophthalic acid, 4-sulfonaphthalene-2,7-dicarboxylic acid, 5-(4-sulfophenoxy)isophthalic acid, or the like. The metal salts include salts of the metals such as lithium, sodium, potassium, magnesium, calcium, copper, iron or the like. Such saturated copolyesters (I) are particularly suitable for the preparation of ultraviolet curable resin compositions having excellent pigment-dispersibility and adhesion.

The saturated copolyester (I) used in the present invention should be soluble in the polymerizable compound (II). That is, the saturated copolyester should be soluble in the polymerizable compound (II), particularly an acrylic ester or methacrylic ester, in an amount of at least 10% by weight, preferably 20% by weight or more, and can give a homogeneous, transparent solution. Saturated copolyesters having a high crystallizability, such as polyethylene terephthalate, polybutylene terephthalate have lower solubility, and hence, they are made soluble by copolymerizing with a polycarboxylic acid such as isophthalic acid or adipic acid and a glycol such as propylene glycol or 1,6-hexanediol. In view of the solubility, the suitable combinations of the acid components of the saturated copolyester (I) are a combination of two components of terephthalic acid and isophthalic acid, or of terephthalic acid and adipic acid; and three components of terephthalic acid, isophthalic acid and adipic acid, or of terephthalic acid, isophthalic acid and sebacic acid. Besides, suitable combinations of the glycol components are a combination of two components of ethylene glycol and propylene glycol, of ethylene glycol and hexanediol, or of ethylene glycol and neopentyl glycol, but they are not limited thereto.

The solubility of the saturated copolyester (I) is also affected by the acid value or molecular weight thereof, and hence, the saturated copolyester (I) should have a molecular weight of 2,000 to 15,000 and an acid value of less than 50. When the saturated copolyester (I) contains nitrogen atom, they show unfavorably low weatherability and low storage stability.

The polymerizable compound (II) is a photopolymerizable compound having at least one polymerizable double bond in the molecule and at least a part (i.e. 1 to 100% by mole) thereof having two or more polymerizable double bonds in the molecule. Preferably, the polymerizable compound (II) comprises 10 to 95% by weight of a compound having one polymerizable double bond in the molecule and 90 to 5% by weight of a compound having two or more polymerizable double bonds in the molecule.

Suitable examples of the photopolymerizable compound having one polymerizable double bond in the molecule are (i) styrene compounds, such as styrene, α-methylstyrene, chlorostyrene; (ii) alkyl acrylates or methacrylates (hereinafter, expressed as "(meth)acrylate"), such as methyl (meth)acrylate, ethyl (meth)acrylate, n- and i-propyl (meth)acrylate, n-, sec- and tert-butyl (meth)acrylate, 2-ethylhexyl (meth)acrylate, lauryl (meth)acrylate, stearyl (meth)acrylate, tetrahydrofurfuryl (meth)acrylate, cyclohexyl (meth)acrylate; alkoxyalkyl (meth)acrylate, such as methoxyethyl (meth)acrylate, ethoxyethyl (meth)acrylate, butoxyethyl (meth)acrylate; aryloxyalkyl (meth)acrylates such as phenoxyethyl (meth)acrylate; hydroxyalkyl (meth)acrylates such as hydroxyethyl acrylate; halogen-substituted alkyl (meth)acrylates; polyalkylene glycol mono(meth)acrylates such as polyethylene glycol mono(meth)acrylate, polypropylene glycol mono(meth)acrylate; substituted alkyl mono(meth)acrylates such as alkoxypolyoxyalkylene mono(meth)acrylate; (iii) mono(meth)acrylate of bisphenol A alkylene oxide adducts such as bisphenol A ethylene oxide and/or propylene oxide adduct, mono(meth)acrylates of hydrogenated bisphenol A alkylene oxide adducts such as hydrogenated bisphenol A ethylene oxide and/or propylene oxide adduct; (iv) urethane-modified mono(meth)acrylates having one (meth)acryloyloxy group in the molecule which is prepared by reacting a diisocyanate compound and a compound containing a terminal isocyanate group, followed by reacting the resulting compound containing a terminal isocyanate group with an alcoholic hydroxy group-containing (meth)acrylate; (v) a epoxy mono(meth)acrylate which is prepared by reacting a compound having one or more epoxy group in the molecule with acrylic or methacrylic acid; (vi) an oligo ester mono(meth)acrylate which is prepared by reacting a carboxylic acid selected from acrylic acid, methacrylic acid and a polycarboxylic acid with an alcohol selected from two or more polyvalent alcohols. Among them, phenoxyethyl methacrylate and tetrahydrofurfuryl acrylate are preferable.

Suitable examples of the photopolymerizable compounds having two polymerizable double bonds in the molecule are (i) alkylene glycol di(meth)acrylates, such as ethylene glycol di(meth)acrylate, propylene glycol di(meth)acrylate, 1,4-butanediol di(meth)acrylate, neopentyl glycol di(meth)acrylate, 1,6-hexanediol di(meth)acrylate; polyoxyalkylene glycol di(meth)acrylates, such as diethylene glycol di(meth)acrylate, triethylene glycol di(meth)acrylate, tri- or more polyethylene glycol di(meth)acrylates, polypropylene glycol di(meth)acrylate; substituted alkylene glycol di(meth)acrylates, such as halogen-substituted alkylene glycol di(meth)acrylates, hydroxy-substituted alkylene glycol di(meth)acrylates; (ii) di(meth)acrylate of bisphenol A alkylene oxide adducts such as bisphenol A ethylene oxide and/or propylene oxide adduct, di(meth)acrylate of hydrogenated bisphenol A alkylene oxide adduct such as hydrogenated bisphenol A ethylene oxide and/or propylene oxide adduct; (iii) urethane-modified di(meth)acrylates having two (meth)acryloyloxy groups in the molecule which is prepared by reacting a diisocyanate compound with a compound containing two or more alcoholic hydroxy groups, followed by reacting the resulting terminal isocyanate group-containing compound with an alcoholic hydroxy group-containing (meth)acrylate; (iv) an epoxy di(meth)acrylate which is prepared by reacting a compound containing two epoxy groups in the molecule with acrylic or methacrylic acid; (v) an oligo ester di(meth)acrylate which is prepared by reacting a carboxylic acid selected from acrylic acid, methacrylic acid and a polycarboxylic acid with an alcohol selected from two or more polyvalent alcohol.

Suitable examples of the photopolymerizable compounds having three or more polymerizable double bonds in the molecule are (i) poly(meth)acrylate of tri- or more polyvalent aliphatic alcohols, such as trimethylolpropane tri(meth)acrylate, trimethylolethane tri(meth)acrylate, pentaerythritol tetra(meth)acrylate; poly(meth)acrylate of tri- or more polyvalent halogen-substituted alcohol or tri- or more polyvalent hydroxy-substituted aliphatic alcohol; (ii) a urethane-modified poly(meth)acrylate which is prepared by reacting a diisocyanate compound with a compound containing two or more alcoholic hydroxy groups, followed by reacting the resulting terminal isocyanate group-containing compound with an alcoholic hydroxy group-containing (meth)acrylate.

These polymerizable compounds (II) may be used alone or in combination of two or more kinds thereof. However, at least a part of the polymerizable compounds (II) should be a compound having two or more polymerizable double bonds in the molecule. That is, the polymerizable compound (II) to be incorporated into the present ultraviolet curable resin composition comprises 1 to 100% by weight, preferably 5 to 90% by weight, [based on the whole weight of the polymerizable compounds (II)] of a compound having two or more polymerizable double bonds in the molecule. When the polymerizable compound (II) comprises a compound having one polymerizable double bond in the molecule and a compound having two, three or four polymerizable double bonds in the molecule, the compound having two or more polymerizable double bonds is preferably used in an amount of 5 to 70% by weight based on the whole polymerizable compounds. Besides, when the polymerizable compound (II) comprises a compound having two polymerizable double bonds in the molecule and a compound having three or four polymerizable double bonds in the molecule, the compound having two polymerizable double bonds is preferably used in an amount of 85 to 95% by weight based on the whole polymerizable compounds. When the polymerizable compound (II) consists of only a compound having one polymerizable double bonds in the molecule, it can not be used in the present invention, because the composition can not be cured.

Particularly preferred polymerizable compound (II) comprises (a) 10 to 70% by weight of a mono(meth)acrylate, (b) 5 to 50% by weight of one or more poly(meth)acrylates selected from two or more poly(meth)acrylates having a molecular weight smaller than 500, dipentaerythritol penta(meth)acrylate and dipentaerythritol hexa(meth)acrylate, and (c) 20 to 70% by weight of di(meth)acrylate having a molecular weight of larger than 500, which is particularly suitable for the preparation of ultraviolet curable composition having excellent solvent resistance and excellent adhesion.

The saturated copolyester (I) and the polymerizable compound (II) are incorporated in the weight ratio of a saturated copolyester (I): a polymerizable compound (II)=10:90 to 80:20, preferably 30:70 to 70:30. When the copolyester (I) is incorporated in an amount of less than 10% by weight, there can not be obtained the desired ultraviolet curable resin composition having excellent adhesion and flexibility, and on the other hand, when the copolyester (I) is used in an amount of more than 80% by weight, the composition is too viscous and is not practically useful.

The photosensitizer (III) used in the present invention includes any compounds which can promote the photopolymerization reaction of the above polymerizable compounds (II), for example, benzoins such as benzoin methyl ether, benzoin ethyl ether, benzoin i-propyl ether, benzoin, α-methylbenzoin; anthraquinones such as 9,10-anthraquinone, 1-chloroanthraquinone, 2-chloroanthraquinone; benzophenones such as benzophenone, p-chlorobenzophenone, p-dimethylaminobenzophenone; sulfur-containing compounds such as diphenyl disulfide, tetramethylthiuram disulfide; pigments such as methylene blue, eosine, fluoresceine; or the like, which may be used alone or in combination of two or more kinds thereof.

Other suitable photosensitizers are (a) one or more compounds selected from xanthone, thioxanthone and a derivative thereof and (b) a compound of the formula:

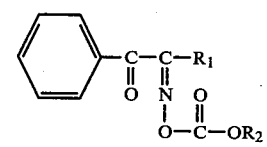

wherein $R_1$ and $R_2$ are each a hydrocarbon group having 1 to 10 carbon atoms. These compounds (a) and (b) may be used each alone but are preferably used in combination thereof in the weight ratio of 4/1 to 1/4. When such a specific combination of photosensitizer is used, there can be obtained an ultraviolet curable resin composition having excellent curability as well as excellent adhesion, flexibility and processability.

Suitable examples of the xanthone, thioxanthone or derivatives thereof (a) are xanthone, and its alkyl-, nitro- and/or halogen-substituted derivatives such as 2-methylxanthone, 2-ethylxanthone, 3-methylxanthone, 3-ethylxanthone, 3-methoxyxanthone, 3-ethoxyxanthone, 2-methyl-7-nitroxanthone, 2-nitroxanthone, 2-chloroxanthone, 2,7-dichloroxanthone, 2,7-dinitroxanthone; thioxanthone and its alkyl-, nitro- and/or halogen-substituted derivatives such as 2-methylthioxanthone, 2-isopropylthioxanthone, 2-chlorothioxanthone, 2-nitrothioxanthone, 3-nitrothioxanthone, 2-methoxythioxanthone, 2-methyl-7-nitrothioxanthone, 2,7-dimethylthioxanthone; or the like.

In the above compound of the formula (I), the groups $R_1$ and $R_2$ are a hydrocarbon group having 1 to 10 carbon atoms, particularly, an alkyl having 1 to 10 carbon atoms (e.g. metyl, ethyl, propyl, butyl, etc.), an aryl having 6 to 10 carbon atoms (e.g. phenyl, xylyl, tolyl, etc.) and an aralkyl having 7 to 10 carbon atoms (e.g. phenylmethyl, phenylethyl, etc.). Suitable examples of the compound (I) are 1-phenyl-1,2-propanedione-2-(O-ethoxycarbonyl)oxime, 1-phenyl-1,2-propanedione-2-(O-n-propoxycarbonyl)oxime, 1-phenyl-1,2-butanedione-2-(O-ethoxycarbonyl)oxime, 1-phenyl-1,2-butanedione-2-(O-n-propoxycarbonyl)oxime, 1,2-diphenyl-1,2-ethanedione-1-(O-ethoxycarbonyl)oxime, 1,2-diphenyl-1,2-ethanedione-1-(O-n-propoxycarbonyl)oxime, or the like.

These compound (a) and compound (b) may also be incorporated together with other conventional photosensitizers as mentioned above.

The photosensitizer (III) is incorporated into the resin composition in an amount of 0.05 to 20% by weight, preferably 0.5 to 10% by weight, based on the whole weight of the resin composition.

In order to further increase the photocuring reaction-promoting activity of the photosensitizer (III), there may also be incorporated a photosensitizing auxiliary, such as amines (e.g. triethanolamine, triethylamine, N,N-diethylaminoethyl (meth)acrylate), phosphorous compounds (e.g. triphenylphosphine), or the like.

When the ultraviolet curable resin composition of the present invention is incorporated with a divalent or more polyvalent organic isocyanate compound in addition to the saturated copolyester (I), polymerizable compound (II) and photosensitizer (III), it shows excellent solvent resistance, particularly xylene resistance, as well as excellent adhesion, flexibility and processability. Suitable examples of the organic isocyanate compound are 2,4-tolylenediisocyanate, 2,6-tolylenediisocyanate, isophoronediisocyanate, hexamethylenediisocyanate, xylylenediisocyanate, hydrogenated xylylenediisocyanate, diphenylmethane-4,4'-diisocyanate, Millionate MR (made by Nippon Polyurethane Kogyo), Collonate L (made by Nippon Polyurethane Kogyo), and further various terminal isocyanate group-containing compounds which are prepared by reacting an excess amount of the above-mentioned organic isocyanate compounds with low molecular weight active hydrogen compounds (e.g. ethylene glycol, propylene glycol, trimethylolpropane, glycerin, sorbitol, ethylenediamine, monoethanolamine, diethanolamine, triethanolamine), various high molecular weight active hydrogen compounds (e.g. polyether polyols, polyester polyols, polyamides), and further blocked organic isocyanate compounds which are prepared by blocking the above-mentioned terminal isocyanate group-containing compounds with a blocking agent, such as phenols (e.g. phenol, thiophenol, methylthiophenol, cresol, xylenol, resorcinol, ethylphenol, nitrophenol, chlorophenol), oximes (e.g. acetoxime, methyl ethyl ketoxime, cyclohexanone oxime), primary alcohols (e.g. methanol, ethanol, propanol, butanol), halogen-substituted alcohols (e.g. ethylene chlorohydrine, 1,3-dichloro-2-propanol), tertiary alcohols (e.g. tert-butanol, tert-pentanol), lactams (e.g. ε-caprolactam, δ-valerolactam, γ-butyrolactom, β-propiolactam), aromatic amines, imides, active methylene compounds, mercaptanes, imines, ureas, diaryl compounds, or the like. These divalent or more polyvalent organic isocyanate compounds are used in an amount of 0.1 to 20.0 parts by weight (0.1 to 20.0 PHR) per 100 parts by weight of the total weight of the saturated copolyester (I), polymerizable compound (II) and photosensitizer (III). In order to promote the effect of the organic isocyanate compound, there may also be incorporated a tin compound (e.g. dibutyl tin dilaurate) or an amine compound (e.g. triethylamine).

The ultraviolet curable resin composition of the present invention may also be incorporated with any conventional thermal polymerization inhibitor in order to prevent undesirable thermal polymerization during the preparation steps or undesirable dark reaction during storage of the composition. Suitable examples of the thermal polymerization inhibitor are hydroquinone, hydroquinone monomethyl ether, tert-butyl catechol, p-benzoquinone, 2,5-di-tert-butylhydroquinone, phenothiazine, or the like. The thermal polymerization inhibitors are usually incorporated in an amount of 0.0001 to 0.1% by weight, preferably 0.001 to 0.05% by weight, based on the weight of the polymerizable compound (II).

In accordance with the intended utility, the ultraviolet curable resin composition of the present invention may also be incorporated with various pigments, such as white pigments (e.g. titanium oxide, zinc white, white lead), black pigments (e.g. carbon black, lamp black, graphite), gray pigments (e.g. zinc powder, lead suboxide, slate dust), red pigments (e.g. cadmium red, cadmium-mercury red, red ocher), yellow pigments (e.g. cadmium yellow, zinc yellow, chrome yellow, titanium yellow), green pigments (e.g. viridian, chrome oxide green, cobalt green, chrome green), blue pigments (e.g. ultramerine blue, iron blue, cobalt blue), violet pigments (e.g. manganese violet, cobalt violet), iron oxide pigments (e.g. brown iron oxide, iron oxide black), extender pigments (e.g. calcium carbonate, barium sulfate, alumina, talc, clay), azo type organic pigments (e.g. permanent red 4R, Hansa yellow G, Hansa yellow 10 G, brilliant carmine 3B, brilliant carmine 6B), phthalocyanine organic pigments (e.g. phthalocyanine green, first sky blue), metallic powder pigments (e.g. silver pigments, copper pigment, gold pigment), glass powder, glass flake, glass bead, or the like.

Moreover, the ultraviolet curable resin composition may be incorporated with conventional lubricating agents, such as acrylic additives (e.g. Modaflow, made by Monsanto Co., or Polyflow S, made by Kyoeisha Yushi), silicone additives (e.g. Baysilone OL, made by Bayer, YF-3818, XF-3913, TSA-720, made by Toshiba Silicone), and further with synthetic resins other than the saturated copolyester (I) provided that the desired properties of the present composition are not deteriorated, for example, melamine resins, epoxy resins, phenoxy resins, polyurethane resins, polystyrene, polybutadiene, polyvinyl chloride, polyethylene, polypropylene, polyvinyl acetate, ethylene-vinyl acetate copolymer, styrene-butadiene copolymer, styrene-acrylonitrile copolymer, vinyl chloride-vinyl acetate copolymer, styrene-maleic anhydride copolymer, butadiene-maleic anhydride copolymer, or the like.

The ultraviolet curable resin composition can be coated or printed onto base materials by conventional coating or printing methods, followed by irradiating with ultraviolet light to start the photopolymerization reaction and then to cure the composition. The irradiation by ultraviolet light can be carried out with various light sources, such as a sun light, a chemical lamp, a low pressure mercury-vapor lamp, a high pressure mercury-vapor lamp, a carbon arc lamp, a xenon lamp, a metal halide lamp, or the like. The curing of the resin composition may also be carried out by thermal polymerization with organic peroxides or by irradiation with electron rays. In the latter case, the photosensitizer is not necessarily essential.

The ultraviolet curable resin composition of the present invention shows excellent adhesion, flexibility and processability which can not be shown by the conventional ultraviolet curable resins, and can be used for various utilities, such as inks, paints or as a binder for coating agents, which are used for glasses, pottery, metals, plastic products, films, coated metal plates, or the like.

Particularly, the ultraviolet curable resin composition is useful as inks for ultraviolet curable screen printing by being incorporated with various pigments as mentioned hereinbefore.

The ultraviolet curable resin composition is also useful as a binder for the preparation of various laminated products of various metals, coated metals, plastics, films, glasses, pottery, fiber products. Among the base materials for the laminated products, at least one should have ultraviolet transparency. For example, transparent plastics, films or glasses are preferably used as a base material. Thus, the preferred laminated products can be prepared by laminating a base material such as metals, coated metals, plastics, films, glasses, pottery or fiber products with a transparent base material such as transparent plastics, films or glasses. The laminated products can be prepared by coating the ultraviolet curable resin composition onto one of the base materials, piling up another base material on the coating layer, and then irradiating with ultraviolet from the side of the transparent base material so as to cure the resin composition. Alternatively, the resin composition is coated onto a base material and irradiated with ultraviolet so that the resin composition is semicured, and then another base baterial is piled thereon, and the resin composition is completely cured by irradiation with ultraviolet.

The ultraviolet curable resin composition of the present invention is also useful for the preparation of a transfer paper for decorating pottery. The transfer paper for decorating pottery comprises a base paper, a design layer of ink and a cover coat. The ultraviolet curable resin composition is used for preparing the design layer of ink. When the ink layer is formed by the present ultraviolet curable resin composition, the transfer paper for decorating potteries shows superior calcining properties to the conventional solvent type transfer paper and further has the following characteristics:

(1) Fine design can be printed with good reproducibility without clogging of the screen printing plate, and hence, a high grade decoration can be obtained.

(2) The thickness of the design layer of ink can be made constant, and hence, calcination can uniformly be done.

(3) Because of the excellent flexibility of the ultraviolet curable resin composition, the resin does not scatter together with pigments during the thermal decomposition to give uniform calcination.

In order to use as an ink, the ultraviolet curable resin composition is incorporated with heat resistant inorganic pigments suitable for decorating the potteries. Suitable examples of the heat resistant inorganic pigments are magnesia, alumina, titania, tin oxide, antimony oxide, platinum, palladium, chromium oxide, cobalt oxide, manganese oxide, cerium oxide, nickel oxide, iron oxide, copper oxide, vanadium stannate, lead chromate, uranium yellow, cadmium sulfide, gold, iron titanate, uranium titanate, cadmium-selenium red, cobalt titanate, gold chloride, manganese sulfate, vanadium pentoxide. In order to promoate uniform coloring, there may also be incorporated with conventional flit or flux composed of various metal oxides such as $Li_2O$, $Na_2O$, $K_2O$, $MgO$, $CaO$, $BaO$, $ZnO$, $PbO$, $B_2O_3$, $Al_2O_3$, $SiO_2$.

The layer of the cover coat of the transfer paper may be formed with the conventional solvent type (meth)acrylic resin (e.g. OPL-100, made by Kyoeisha Yushi), but is preferably formed with an ultraviolet curable resin composition comprising a (meth)acrylic ester polymer, polymerizable compound and a photosensitizer. The (methacrylic ester polymer is a homopolymer or copolymer of a compound of the formula:

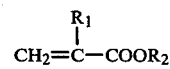

wherein $R_1$ is hydrogen or methyl, and $R_2$ is an alkyl, aralkyl or aryl group having 1 to 20 carbon atoms. Suitable examples of the polymer are methyl methacrylate-ethyl methacrylate copolymer, methyl methacrylate-propyl methacrylate copolymer, methyl methacrylate-butyl methacrylate copolymer, which have a molecular weight of 1,000 to 1,000,000 preferably 20,000 to 800,000. The polymerizable compound may be the same as mentioned hereinbefore, but is preferably methacrylate compounds (rather than acrylate compounds), and the compound is not required to have two or more double bonds in the molecule, but rather, the preferred polymerizable compounds may have only single polymerizable double bond. The (meth)acrylic ester copolymer and the polymerizable compound are incorporated in the weight ratio of (meth)acrylic ester polymer:polymerizable compound=5:95 to 90:10, preferably 20:80 to 80:20. Besides, the photosensitizer is the same as mentioned hereinbefore and is used in an amount of 0.5 to 20% by weight, preferably 1 to 10% by weight, based on the whole weight of the resin composition.

These ultraviolet curable resin compositions used for the ink layer and the cover coat layer may also be incorporated with other conventional thermal polymerization inhibitors, leveling agents, defoaming agents, thickening agents, thixotropic agents in order to control the viscosity, stability and printing properties.

The base paper used for the transfer paper may be conventional simple paper, collodion-coated paper, separate paper, thermaflat paper.

The transfer papers for decorating pottery are useful for decorating various products such as pottery, porcelains, glasses, tiles, ceramics, or the like.

The present invention is illustrated by the following Preparations and Examples, but is not limited thereto.

In the Preparations and Examples, "part" means part by weight unless specified otherwise, and various properties were measured in the following manner.

(1) % by mole of the components in polyesters: by NMR analysis (solvent; $CDCl_3$)

(2) Molecular weight: by vapor pressure depression method (3) Pencil hardness of the cured coating layer: by the method as described in JIS K 5400

(4) Adhesion: by the method as described in ASTM D-3359

(5) Gloss of the cured coating layer: it was measured with a glossmeter (Type-VG 107, made by Nippon Denshoku Kogyo K.K.) at an angle of 60°.

(6) Water resistance of printed matter: the printed matter was dipped in water at 25° C., and thereafter, the change of appearance was observed.

(7) Alcohol resistance: the product to be tested was rubbed with a gauze impregnated with methanol 50 times, and thereafter, the change of appearance was observed.

(8) Solvent (xylene) resistance: the product to be tested was rubbed with a gauze impregnated with xylene until the substrate appeared, and the time of rubbing was calculated.

Preparation 1

A stainless steel autoclave provided with a stirrer, a thermometer and a partial reflux condenser was charged with dimethyl terephthalate (194 parts), dimethyl isophthalate (194 parts), ethylene glycol (191 parts), 1,6-hexanediol (156 parts) and tetra-n-butyl titanate (0.25 part), and the mixture was gradually heated until 220° C. and then reacted at 220° C. for 2 hours. After the pressure was gradually reduced, the mixture was reacted under reduced pressure (10 mmHg) at 260° C. for one hour to give a saturated copolyester (A). The saturated copolyester (A) had a molecular weight of 3,900 and had a composition of (measured by NMR) polycarboxylic acid components: terephthalic acid, 50% by mole and isophthalic acid, 50% by mole, and polyvalent alcohol components: ethylene glycol, 40% by mole and 1,6-hexanediol, 60% by mole.

In the same manner as described above, various saturated copolyesters (B to E) as shown in Table 1 were prepared.

TABLE 1

| Components (% by mole) | Saturated copolyesters | | | | |
|---|---|---|---|---|---|
| | A | B | C | D | E |
| Polycarboxylic acid components: | | | | | |
| Terephthalic acid | 50 | 45 | 40 | 50 | 50 |
| Isophthalic acid | 50 | 40 | 50 | 50 | 40 |
| Adipic acid | — | — | 10 | — | — |
| Sebacic acid | — | 15 | — | — | 10 |
| Polyvalent alcohol components: | | | | | |
| Ethylene glycol | 40 | 50 | 52 | 45 | 48 |
| Propylene glycol | — | — | — | 55 | — |
| Neopentyl glycol | — | 50 | 48 | — | — |
| 1,6-Hexanediol | 60 | — | — | — | 52 |
| Molecular weight | 3,900 | 4,200 | 4,600 | 3,500 | 3,800 |

Preparation 2

Into the same reactor as used in Preparation 1 were charged adipic acid (292 parts), ethylene glycol (125 parts), 1,4-butanediol (89 parts) and tetra-n-butyl titanate (0.25 part), and the mixture was gradually heated to 220° C. and was reacted at 220° C. for one hour. After the pressure was gradually reduced, the mixture was reacted under reduced pressure (0.3 mmHg) at 220° C. for one hour and 5 minutes to give a saturated copolyester (F). The copolyester (F) had a molecular weight of 4,900 and had a composition of polycarboxylic acid component: adipic acid, 100% by mole and polyvalent alcohol components: ethylene glycol, 57% by mole and 1,4-butanediol, 43% by mole.

Preparation 3

The above Preparation 2 was repeated except that adipic acid (248 parts) and isophthalic acid (50 parts) were used instead of adipic acid (292 parts) to give a saturated copolyester (G). The saturated copolyester (G) had a molecular weight of 4,500 and had a composition of polycarboxylic acid components: adipic acid, 85% by mole and isophthalic acid, 15% by mole, and polyvalent alcohol components: ethylene glycol, 58% by mole and 1,4-butanediol, 42% by mole.

Preparation 4

A stainless steel autoclave provided with a stirrer, a thermometer and a partial reflux condenser was charged with terephthalic acid (149 parts), isophthalic acid (133 parts), sebacic acid (61 parts), ethylene glycol (121 parts), neopentyl glycol (109 parts) and tetra-n-butyl titanate (0.41 part), and the mixture was reacted at 240° C. under a pressure of 3 kg/cm²G. After the pressure was gradually reduced, the mixture was reacted under reduced pressure (lower than 0.2 mmHg) at 260°–270° C. for 2 hours to give a saturated copolyester (H). The saturated copolyester had a molecular weight of 19,000 and had a composition of polycarboxylic acid components: terephthalic acid 45% by mole, isophthalic acid, 40% by mole and sebacic acid, 15% by mole, and polyvalent alcohol components: ethylene glycol, 47% by mole and neopentyl glycol, 53% by mole.

Preparation 5

In the same manner as described in Preparation 1 except that the starting materials (components) as shown in Table 2 were used, there were prepared saturated copolyester (I to M) as shown in Table 2.

TABLE 2

| Components (% by mole) | Saturated copolyesters | | | | |
|---|---|---|---|---|---|
| | I | J | K | L | M |
| Polycarboxylic acid components: | | | | | |
| Terephthalic acid | 50 | 50 | 50 | 50 | 45 |
| Isophthalic acid | 50 | 50 | 50 | 50 | 40 |
| Adipic acid | — | — | — | — | — |
| Sebacic acid | — | — | — | — | 15 |
| Polyvalent alcohol components: | | | | | |
| Ethylene glycol | 40 | 40 | 39 | 40 | 49 |
| Propylene glycol | — | — | — | — | — |
| Neopentyl glycol | — | — | — | — | — |
| 1,6-Hexanediol | 60 | 60 | 61 | 60 | 51 |
| Molecular weight | 3,200 | 3,400 | 2,240 | 4,900 | 4,250 |

Preparation 6

Into the same reactor as used in Preparation 1 were charged dimethyl terephthalate (190 parts), dimethyl isophthalate (188 parts), ethylene glycol (191 parts), 1,6-hexanediol (156 parts) and tetra-n-butyl titanate (0.25 part), and the mixture was gradually heated to 220° C., and was reacted at 220° C. for 2 hours. To the resulting mixture was added 5-sodium sulfoisophthalic acid (13.5 parts), and the mixture was reacted at 220° to 260° C. for one hour. The mixture was further reacted under reduced pressure (10 mmHg) at 260° C. for one hour to give a saturated copolyester (N). The saturated copolyester (N) had a molecular weight of 3,500 and had a composition of polycarboxylic acid components: terephthalic acid, 49.0% by mole, isophthalic acid, 48.5% by mole and 5-sodium sulfoisophthalic acid, 2.5% by mole, and polyvalent alcohol components: ethylene glycol, 40% by mole, 1,6-hexanediol, 60% by mole.

EXAMPLE 1

The saturated copolyester (A) (50 parts) prepared in Preparation 1, a polymerizable compound (50 parts) as shown in Table 3, benzoin ethyl ether (3 parts, as a photosensitizer), and hydroquinone (0.01 part, as a thermal polymerization inhibitor) were mixed and dissolved by heating at 80° C. to give ultraviolet curable resin compositions (X-1 to X-11) which were a transparent solution.

The resin compositions thus prepared were each coated onto a non-treated polyethylene terephthalate film (thickness: 125μ) and a non-treated soft steel panel (provided in JIS G-3141) with a bar coater #20 and thereafter were irradiated with a 5.6 KW high pressure mercury-vapor lamp at a height of 15 cm for 30 seconds to give a transparent cured coating layer. The properties of the cured coating layer were measured. The results are shown in Table 3.

EXAMPLE 2

In the same manner as described in Example 1 except that the saturated copolyesters (B to E) were used, there were prepared ultraviolet curable resin compositions (X-12 to X-15), and coating layers therefrom. The results are shown in Table 4.

TABLE 3

| Resin comp. No. | Saturated copolyester (A) (parts) | Polymerizable compound (parts) | | Viscosity (poise) | Pencil hardness | Adhesion Polyethylene terephthalate film | Soft steel panel |
|---|---|---|---|---|---|---|---|
| X-1 | 50 | Styrene | 20 | 33.2 | HB | 100/100 | 100/100 |
| | | Phenoxyethyl methacrylate | 10 | | | | |
| | | Ethylene glycol dimethacrylate | 20 | | | | |
| X-2 | 50 | Styrene | 30 | 17.5 | HB | 100/100 | 100/100 |
| | | Ethylene glycol dimethacrylate | 20 | | | | |
| X-3 | 50 | Styrene | 15 | 32.0 | F | 100/100 | 100/100 |
| | | Ethylene glycol dimethacrylate | 15 | | | | |
| | | 1,6-Hexanediol diacrylate | 20 | | | | |
| X-4 | 50 | Tetrahydrofurfuryl acrylate | 25 | 69.0 | F | 100/100 | 100/100 |
| | | Ethylene glycol dimethacrylate | 25 | | | | |
| X-5 | 50 | Styrene | 10 | 48.0 | F | 100/100 | 100/100 |
| | | Tetrahydrofurfuryl acrylate | 15 | | | | |
| | | Ethylene glycol dimethacrylate | 25 | | | | |
| X-6 | 50 | Tetrahydrofurfuryl acrylate | 25 | 123.0 | H | 100/100 | 100/100 |
| | | Neopentylglycol diacrylate | 25 | | | | |
| X-7 | 50 | Tetrahydrofurfuryl acrylate | 25 | 96.8 | H | 100/100 | 100/100 |
| | | 1,6-Hexanediol diacrylate | 25 | | | | |
| X-8 | 50 | Styrene | 35 | 25.2 | F | 100/100 | 100/100 |
| | | Trimethylolpropane triacrylate | 15 | | | | |
| X-9 | 30 | Styrene | 50 | 8.1 | B | 100/100 | 100/100 |
| | | Ethylene glycol dimethacrylate | 20 | | | | |
| X-10 | 40 | Styrene | 40 | 10.8 | B | 100/100 | 100/100 |
| | | Ethylene glycol dimethacrylate | 20 | | | | |
| X-11 | 60 | Styrene | 20 | 57.8 | HB | 100/100 | 100/100 |
| | | Ethylene glycol dimethacrylate | 20 | | | | |
| Reference | — | Styrene | 50 | <1 | It was very slowly cured. Tackiness was not lost. Adhesion was inferior. | | |
| | | 1,6-Hexanediol diacrylate | 40 | | | | |
| | | Trimethylolpropane triacrylate | 10 | | | | |

For comparison purpose, the example was repeated except that the saturated copolyesters (F and G) prepared in Preparations 2 and 3 were used. The results are also shown in Table 4.

TABLE 4

| Resin comp. No. | Saturated copolyester (parts) | | Polymerizable compound (parts) | | Viscosity (poise) | Pencil hardness | Adhesion Polyethylene terephthalate film | Soft steel panel |
|---|---|---|---|---|---|---|---|---|
| X-12 | B | 50 | Tetrahydrofurfuryl acrylate | 25 | 61.3 | B | 100/100 | 100/100 |
| | | | Ethylene glycol dimethacrylate | 25 | | | | |
| X-13 | C | 50 | Tetrahydrofurfuryl acrylate | 25 | 84.2 | B | 100/100 | 100/100 |
| | | | Ethylene glycol dimethacrylate | 25 | | | | |

TABLE 4-continued

| Resin comp. No. | Saturated copoly-ester (parts) | | Polymerizable compound (parts) | | Vis-cosity (poise) | Pencil hard-ness | Adhesion | |
|---|---|---|---|---|---|---|---|---|
| | | | | | | | Polyethylene terephthalate film | Soft steel panel |
| X-14 | D | 50 | Tetrahydrofurfuryl acrylate | 25 | 83.6 | HB | 100/100 | 100/100 |
| | | | Ethylene glycol dimethacrylate | 25 | | | | |
| X-15 | E | 50 | Tetrahydrofurfuryl acrylate | 25 | 71.8 | HB | 100/100 | 100/100 |
| | | | Ethylene glycol dimethacrylate | 25 | | | | |
| X-16 | E | 50 | Tetrahydrofurfuryl acrylate | 30 | | | | |
| | | | Ethylene glycol dimethacrylate | 15 | 79.0 | F | 100/100 | 100/100 |
| | | | Trimethylolpropane triacrylate | 5 | | | | |
| Reference | F | 50 | Tetrahydrofurfuryl acrylate | 25 | 9.8 | 5B | 0/100 | 0/100 |
| | | | Ethylene glycol dimethacrylate | 25 | | | | |
| Reference | G | 50 | Tetrahydrofurfuryl acrylate | 25 | 15.8 | 4B | 0/100 | 0/100 |
| | | | Ethylene glycol dimethacrylate | 25 | | | | |

REFERENCE EXAMPLE 1

The saturated copolyester (H) (50 parts) prepared in Preparation 4, tetrahydrofurfuryl acrylate (20 parts), styrene (10 parts), ethylene glycol dimethacrylate (20 parts), benzoin ethyl ether (3 parts) and hydroquinone (0.01 part) were stirred at 80° C., but they showed inferior solubility and a homogeneous solution could not be obtained.

EXAMPLE 3

The saturated copolyester (A) (50 parts) prepared in Preparation 1 was dissolved at 80° C. in a mixture of tetrahydrofurfuryl acrylate (25 parts), neopentyl glycol diacrylate (25 parts), trimethylolpropane triacrylate (3 parts), diacrylate of bisphenol A ethylene oxide (4 mole) adduct (2 parts) and hydroquinone monomethyl ether (0.02 part), and therein was further dissolved benzoin ethyl ether (6 parts) to give an ultraviolet curable resin composition (X-17) of the present invention.

The resin composition thus obtained (85 parts) and titanium dioxide (15 parts) were well kneaded with a three roll mill to give an ultraviolet curable ink composition. By using this ink composition, a non-treated tinplate (thickness: 0.3 mm) with a 270 mesh screen printing plate, and then the resulting plate was irradiated with a 5.6 KW mercury vapor lamp at a height of 12 cm for 15 seconds. The coating layer had the following properties:
 Pencil hardness: H
 Adhesion: 100/100

Besides, this printed tinplate was bent at 180°, but there was not observed any peeling or breaking of the printed coating layer.

EXAMPLES 4 TO 8

The saturated copolyester (A) (50 parts), a polymerizable compound (50 parts) as shown in Table 5 and hydroquinone (0.01 part) were mixed well at 80° C. to give a resin composition. The resin composition (90 parts), carbon black (5 parts), a silicone additive (0.1 part) and photosensitizers: 2-methylthioxanthone (2.5 parts) and 1-phenyl-1,2-propanedione-2-(O-ethoxycarbonyl) oxime (2.5 parts) were kneaded with a three roll mill to give an ultraviolet curable ink composition.

By using this ink composition, a non-treated polyethylene terephthalate film (thickness: 125μ) was printed with a 270 mesh screen printing plate in a thickness of the coating layer of about 15μ, and then the printed plate was irradiated with a 5.6 KW high pressure mercury vapor lamp at a height of 15 cm. The curing rate of the coating layer and the properties of the coating layer were measured. The results are shown in Table 5.

TABLE 5

| Ex. No. | Polymerizable compounds (parts) | | Curing rate (sec.) | Properties of the cured coating layer | | |
|---|---|---|---|---|---|---|
| | | | | Adhesion | Pencil hardness | Reflectance of surface gloss (%) |
| 4 | Tetrahydrofurfuryl acrylate | 25 | 3.8 | 100/100 | F | 96 |
| | Neopentyl glycol diacrylate | 25 | | | | |
| 5 | Tetrahydrofurfuryl acrylate | 30 | 3.9 | 100/100 | F | 96 |
| | 1,6-Hexanediol diacrylate | 20 | | | | |
| 6 | Phenoxyethyl methacrylate | 5 | | | | |
| | Tetrahydrofurfuryl acrylate | 25 | 4.2 | 100/100 | HB | 89 |
| | 1,4-Butanediol diacrylate | 20 | | | | |
| 7 | Tetrahydrofurfuryl acrylate | 20 | | | | |
| | 1,6-Hexanediol diacrylate | 20 | 3.6 | 100/100 | F | 94 |
| | Bisphenol A ethylene oxide adduct diacrylate | 10 | | | | |
| 8 | Cyclohexyl methacrylate | 5 | | | | |
| | Tetrahydrofurfuryl acrylate | 20 | 4.8 | 100/100 | H | 87 |
| | Neopentyl glycol diacrylate | 10 | | | | |

TABLE 5-continued

| Ex. No. | Polymerizable compounds (parts) | Curing rate (sec.) | Properties of the cured coating layer | | |
|---|---|---|---|---|---|
| | | | Adhesion | Pencil hardness | Reflectance of surface gloss (%) |
| | Trimethylolpropane triacrylate 5 | | | | |

EXAMPLES 9 TO 13

The saturated copolyester (A, I, J, K or L) (50 parts), tetrahydrofurfuryl acrylate (30 parts), 1,6-hexanediol diacrylate (20 parts), and hydroquinone monomethyl ether (0.01 part) were stirred at 80° C. to give a transparent, homogeneous solution. The viscosity of the solution was measured. The results are shown in Table 6.

The solution obtained above (90 parts), brilliant carmine 6B (5 parts), benzoin ethyl ether (6 parts) and a silicone additive (0.1 part) were kneaded well with a three roll mill to give an ultraviolet curable ink composition for screen printing. By using the ink composition, a non-treated polyethylene terephthalate film (thickness: 125μ) was printed with a 300 mesh polyethylene polyester screen printing plate and the printed plate was irradiated with a 5.6 KW high pressure mercury vapor lamp at a height of 12 cm for 8 seconds to give a cured coating layer. The properties of the cured coating layer were measured. The results are shown in Table 6.

All ink compositions showed excellent release characteristics and leveling and hence had practical printing properties.

TABLE 6

| Ex. No. | Saturated copolyester | Viscosity of solution at 25° C. (poise) | Properties of cured coating layer | | | |
|---|---|---|---|---|---|---|
| | | | Pencil hardness | Adhesion | Water resistance | Alcohol resistance |
| 9 | A | 110 | F | 100/100 | Excellent | Excellent |
| 10 | I | 62 | F | " | " | " |
| 11 | J | 71 | F | " | " | " |
| 12 | K | 23 | HB | " | " | " |
| 13 | L | 230 | HB | " | " | " |

EXAMPLES 14 TO 17

In the same manner as described in Example 9 except that the saturated copolyesters (E, D, M and C) were used, various ultraviolet curable ink compositions were prepared.

By using the ink compositions, a non-treated polyethylene terephthalate film (thickness: 125μ) was printed in the same manner as described in Example 9, and the printed plate was irradiated with a 5.6 KW high pressure mercury vapor lamp at a height of 12 cm for 8 seconds to give a cured coating layer. The properties of the cured coating layer were measured. The results are shown in Table 7.

All ink compositions showed excellent release characteristics and leveling and hence had practical printing properties.

TABLE 7

| Ex. No. | Saturated copolyester | Pencil hardness | Adhesion | Water resistance | Alcohol resistance |
|---|---|---|---|---|---|
| 14 | E | HB | 100/100 | Excellent | Excellent |
| 15 | D | HB | " | " | " |
| 16 | M | F | " | " | " |
| 17 | C | F | " | " | " |

EXAMPLES 18 TO 22

The saturated copolyester (A) was mixed with a polymerizable compound as shown in Table 8 in various ratio to give transparent homogeneous solutions. The viscosity of the solutions was measured. The results are shown in Table 8.

The solution (90 parts), titanium oxide (12 parts), benzoin isopropyl ether (9 parts) and a silicone additive (0.1 part) were kneaded well with a three roll mill to give an ultraviolet curable ink composition for screen printing.

By using the ink composition obtained above, a non-treated tinplate (thickness: 0.3 mm) was printed with a 270 mesh polyester screen printing plate, and the printed plate was irradiated with a 5.6 KW high pressure mercury vapor lamp at a height of 12 cm to give a cured coating layer. The properties of the cured coating layer were measured. For comparison purposes, an ink composition was prepared in the same manner as described above except that the saturated copolyester (A) was not used, and a cured coating layer was formed likewise. The properties of this cured coating layer were also measured. These results are shown in Table 8.

TABLE 8

| Ex. No. | Saturated copolyester (A) and polymerizable compounds (part) | | Viscosity of solution at 25° C. (poise) | Properties of cured coating layer | | | |
|---|---|---|---|---|---|---|---|
| | | | | Pencil hardness | Adhesion | Water resistance | Alcohol resistance |
| 18 | (A) | 50 | | | | | |
| | THF—A | 25 | 112 | F | 100/100 | Excellent | Excellent |
| | 1,6-HX—A | 25 | | | | | |
| 19 | (A) | 50 | | | | | |
| | THF—A | 30 | 98 | F | 100/100 | " | " |
| | NPG—A | 20 | | | | | |
| 20 | (A) | 40 | | | | | |
| | THF—A | 30 | 105 | F | 100/100 | " | " |
| | BP—4EA | 30 | | | | | |
| 21 | (A) | 30 | | | | | |
| | THF—A | 35 | 24 | HB | 100/100 | " | " |
| | BP—4EA | 35 | | | | | |
| 22 | (A) | 50 | | | | | |

TABLE 8-continued

| Ex. No. | Saturated copolyester (A) and polymerizable compounds (part) | | Viscosity of solution at 25° C. (poise) | Properties of cured coating layer | | | |
|---|---|---|---|---|---|---|---|
| | | | | Pencil hardness | Adhesion | Water resistance | Alcohol resistance |
| | THF—A | 30 | 125 | F | 100/100 | " | " |
| | 1,6-HX—A | 15 | | | | | |
| | TMP—A | 5 | | | | | |
| Ref. | THF—A | 50 | <0.1 | B | 0/100 | It was cured very slowly. Tackiness was not disappeared. | |
| | 1,6-HX—A | 50 | | | | | |
| | BP—4EA | 100 | 11 | HB | 0/100 | It was cured very slowly. Tackiness was not disappeared. | |
| | THF—A | 50 | 0.3 | HB | 0/100 | It was cured very slowly. Tackiness was not disappeared. | |
| | BP—4EA | 50 | | | | | |

[Remarks]:
THF—A: Tetrahydrofurfuryl acrylate
NPG—A: Neopentyl glycol diacrylate
TMP—A: Trimethylolpropane triacrylate
1,6-HX—A: 1,6-Hexanediol diacrylate
BP—4EA: Diacrylate of bisphenol A ethylene oxide (4 mole) adduct

REFERENCE EXAMPLES 2 AND 3

In the same manner as described in Example 9 except that the saturated copolyesters (F and G) were used, a non-treated polyethylene terephthalate film (thickness: 125μ) was printed and the properties of the cured coating layer were measured. The results are shown in Table 9.

The ink compositions of the reference examples showed a comparatively lower viscosity, and hence had good leveling and release characteristics, but the properties of the coating layer were inferior from the practical viewpoints as shown in Table 9.

TABLE 9

| Ref. Ex. No. | Saturated copolyester | Viscosity of solution at 25° C. (poise) | Properties of cured coating layer | | | |
|---|---|---|---|---|---|---|
| | | | Pencil hardness | Adhesion | water resistance | Alcohol resistance |
| 2 | F | 12 | 5B | 0/100 | Peeled | Peeled |
| 3 | G | 21 | 4B | 0/100 | " | " |

EXAMPLE 23 AND REFERENCE EXAMPLE 4

The saturated copolyester (A) (50 parts), tetrahydrofurfuryl acrylate (47 parts), 1,6-hexanediol diacrylate (3 parts) and hydroquinone monomethyl ether (0.01 part) were mixed and dissolved at 80° C., and thereto was added benzoin isopropyl ether (2 parts) to give an ultraviolet curable adhesive.

The ultraviolet curable adhesive thus obtained was coated onto a soft steel panel (thickness: 0.8 mm) in a thickness of about 50μ, and thereon a non-treated polyethylene terephthalate film (thickness: 125μ) was laminated, and the resulting laminated product was irradiated with a 5.6 KW high pressure mercury vapor lamp at a height of 15 cm for 5 seconds from the side of the polyethylene terephthalate film to give a cured laminated product. The laminated product adhered strongly, and the polyethylene terephthalate film could hardly be peeled off without breaking of the film.

As the reference, an ultraviolet curable adhesive was prepared in the same manner as described above except that the saturated copolyester (A) was not used, and a laminated product was prepared likewise by using the adhesive. As the result, the polyethylene terephthalate film could easily be peeled off with hand. Thus, the adhesion of the laminated product was very inferior.

EXAMPLE 24

The saturated copolyester (C) (50 parts), tetrahydrofurfuryl acrylate (30 parts), neopentyl glycol diacrylate (20 parts) and hydroquinone monomethyl ether (0.01 part) were mixed and dissolved at 80° C., and thereto was added benzoin ethyl ether (3 parts) to give an ultraviolet curable adhesive.

The ultraviolet curable adhesive thus obtained was coated onto a transparent polycarbonate plate (thickness: 1 mm) and thereon the same polycarbonate plate was laminated. The laminated product was irradiated under the same conditions as in Example 23 from both sides for 10 seconds to give a laminated product which was strongly adhered.

EXAMPLE 25

The saturated copolyester (D) (50 parts), tetrahydrofurfuryl acrylate (30 parts), hydroxyethyl acrylate (5 parts), phenoxyethyl acrylate (5 parts), ethylene glycol dimethacrylate (10 parts) and hydroquinone (0.01 part) were mixed and dissolved at 80° C. to give a resin.

The resin thus obtained (94 parts), brilliant carmine 6B (2 parts), benzoin ethyl ether (6 parts) and a silicone additive (0.5 part) was kneaded well with a three-roll mill to give a colored ultraviolet curable adhesive.

The adhesive thus obtained was coated onto a glass plate (thickness: 2 mm) and thereof the same glass plate was laminated. The laminated product was irradiated from both sides under the same conditions as in Example 24 for 20 seconds to give a colored laminated glass which was strongly adhered.

REFERENCE EXAMPLE 5

In the same manner as described in Example 23 except that the saturated copolyesters (F and G) were used instead of the saturated copolyester (A), there were prepared ultraviolet curable adhesives. By using these adhesives, it was tried to adhere a polyethylene terephthalate film (thickness: 125μ) and a soft steel panel under the same conditions as in Example 23, but in both cases, the laminated product was easily peeled by hand.

REFERENCE EXAMPLE 6

The saturated copolyester (H) (50 parts), tetrahydrofurfuryl acrylate (47 parts), 1,6-hexanediol diacrylate (3 parts) and hydroquinone monomethyl ether (0.01 part)

were mixed and stirred at 80° C., but there could not be prepared a homogeneous solution. Besides, when some saturated copolyesters: Vylon 200, Vylon 30P and Vylon 500 (made by Toyo Boseki K. K.) were used instead of the saturated copolyester (H) in the above procedure, the same results were obtained.

EXAMPLE 6

The saturated copolyesters (A) (50 parts), tetrahydrofurfuryl acrylate (25 parts), neopentyl glycol diacrylate (25 parts) and hydroquinone monomethyl ether (0.01 part) were mixed and dissolved at 80° C., and the mixture was cooled to room temperature and thereto was added benzoin ethyl ether (5 parts) to give an ultraviolet curable resin. To this resin was added an organic isocyanate compound as shown in Table 10 to give an ultraviolet curable resin composition.

The resin composition thus obtained was coated onto a non-treated polyethylene terephthalate film (thickness: 125μ) with a bar coater #20, and the coated product was irradiated with a 5.6 KW high pressure mercury vapor lamp at a height of 15 cm for 10 seconds to give a cured coating layer. The properties of the cured coating layer were measured. The results are shown in Table 10. The coating layer showed inferior xylene resistance immediately after being cured, but after being kept at room temperature, it showed extremely improved xylene resistance.

give an ultraviolet curable resin composition. In the same manner as described above, various ultraviolet curable resin compositions were prepared by using various polymerizable compounds as shown in Table 11.

The resin compositions were coated onto a non-treated polyethylene terephthalate film (thickness: 125μ) and a non-treated soft steel panel with a bar coater #20, and the coated products were irradiated with a 5.6 KW high pressure mercury vapor lamp at a height of 15 cm for 30 seconds to give a transparent cured coating layer. The properties of the cured coating layer were measured. The results are shown in Table 11.

TABLE 11

| Run No. | Saturated copolyester (N) (part) | Polymerizable compounds (part) | | Viscosity (poise) | Pencil hardness | Adhesion | |
|---|---|---|---|---|---|---|---|
| | | | | | | Polyethylene terephthalate film | Soft steel panel |
| 1 | 50 | THF—A | 25 | 180.2 | F | 100/100 | 100/100 |
| | | 1,6-HX—A | 25 | | | | |
| 2 | 50 | THF—A | 25 | 192.1 | F | 100/100 | 100/100 |
| | | NPG—A | 25 | | | | |
| 3 | 50 | THF—A | 30 | 176.6 | HB | 100/100 | 100/100 |
| | | NPG—A | 20 | | | | |
| 4 | 50 | THF—A | 20 | 186.5 | HB | 100/100 | 100/100 |
| | | PE—MA | 5 | | | | |
| | | 1,6-HX—A | 25 | | | | |
| 5 | 40 | THF—A | 30 | 185.7 | F | 100/100 | 100/100 |
| | | BP—4EA | 30 | | | | |

[Remarks]:
THF—A: Tetrahydrofurfuryl acrylate,
1,6-HX—A: 1,6-Hexanediol diacrylate
NPG—A: Neopentyl glycol diacrylate,
PE—MA: Phenoxyethyl methacrylate,
BP—4EA: Diacrylate of bisphenol A ethylene oxide (4 mole adduct

EXAMPLE 8

The saturated copolyester (A) (45 parts) was dissolved at 80° C. in a mixture of tetrahydrofurfuryl acrylate (30 parts), diacylate of bisphenol A ethylene oxide (4 mole) adduct (30 parts), 1,6-hexanediol diacrylate (5 parts) and hydroquinone monomethyl ether (0.02 part), and therein was further dissolved benzoin ethyl ether (7 parts) to give an ultraviolet curable resin composition.

The resin composition thus obtained (85 parts), titanium dioxide (13 parts) and an acrylic lubricating agent (2 parts) were kneaded well with a three roll mill to give an ultraviolet curable ink composition.

By using this ink composition, various materials were printed with a 300 mesh screen printing plate, and the printed products were irradiated with a 5.6 KW high pressure mercury vapor lamp at a height of 12 cm for 15 seconds to give a cured coating layer. The properties of

TABLE 10

| Organic isocyanate compound | | Properties of the cured coating layer | | | |
|---|---|---|---|---|---|
| | | Immediately after being cured. | | After being kept at room temperature for 10 days | |
| Kind | Amount (PHR) | Adhesion | Xylene resistance | Adhesion | Xylene resistance |
| Collonate L* | 1.0 | 100/100 | 5 | 100/100 | 25 |
| | 3.0 | " | 4 | " | 32 |
| | 5.0 | " | 4 | " | >100 |
| | 7.0 | " | 4 | " | >100 |
| Millionate MR* | 1.0 | 100/100 | 5 | 100/100 | 43 |
| | 3.0 | " | 5 | " | 72 |
| | 5.0 | " | 4 | " | >100 |
| | 7.0 | " | 4 | " | >100 |

*Both products are made by Nippon Polyurethane Kogyo K.K.

EXAMPLE 7

The saturated copolyester (N) (50 parts), tetrahydrofurfuryl acrylate (25 parts), 1,6-hexanediol diacrylate (25 parts), benzoin ethyl ether (3 parts) and hydroquinone (0.01 part) were mixed and dissolved at 80° C. to the coating layer were measured. The results are shown in Table 12.

Besides, the ink composition obtained above was added in a glass vial (volume: 100 ml). The vial was sealed and was kept at 25° C. in dark place, and then, the storage stability of the ink composition was evaluated. The results are also shown in Table 12.

TABLE 12

| Properties | Results |
| --- | --- |
| Adhesion onto various materials: | |
| Polyethylene terephthalate film (thickness: 125μ) | 100/100 |
| Polyethylene terephthalate molded plate (thickness: 2 mm) | 100/100 |
| Polycarbonate plate (thickness: 1 mm) | 100/100 |
| Non-treated soft steel panel (thickness: 0.8 mm) | 100/100 |
| Non-treated tinplate (thickness: 0.3 mm) | 100/100 |
| Glass plate (thickness: 2 mm) | 100/100 |
| Storage stability at 25° C. | |
| After 20 days | Not changed |
| After 40 days | " |
| After 60 days | " |

EXAMPLE 9

The saturated copolyester (A) (30 parts), tetrahydrofurfuryl acrylate (17.5 parts), 1,6-hexanediol diacrylate (17.5 parts), diacrylate of bisphenol A ethylene oxide (4 mole) adduct (35 parts) and hydroquinone (0.01 part) were mixed and dissolved at 80° C., and thereto was added benzoin ethyl ether (3 parts) to give an ultraviolet curable resin composition (Run No. 1) which had a viscosity of 120 poise.

The resin composition was coated onto a non-treated polyethylene terephthalate film (thickness: 150μ) with a bar coater #20, and the coated film was irradiated with a 5.6 KW high pressure mercury vapor lamp at a height of 15 cm for 15 seconds to give a cured coating layer. The properties of the cured coating layer were measured. The results are shown in Table 13.

In the same manner as described above except that various polymerizable compounds as shown in Table 13 were used, there were prepared various ultraviolet curable resin compositions (Run Nos. 2 to 7), and curing coating layers were prepared therefrom and properties thereof were measured likewise. The results are also shown in Table 13.

EXAMPLE 30

The saturated copolyester (A) (40 parts), benzoin isopropyl ether (4 parts), selenium red (60 parts) and a leveling agent (2 parts) were kneaded with a three-roll mill to give an ultraviolet curable ink composition.

Separately, methyl methacrylate-n-butyl methacrylate copolymer (molecular weight: 75,000, glass transition temperature: 50° C., 40 parts), hydroxyethyl methacrylate (55 parts), ethylene glycol dimethacrylate (5 parts) and benzoin methyl ether (10 parts) were mixed and dissolved at room temperature to give a transparent, homogeneous ultraviolet curable resin composition.

A simple paper coated with a dextrine solution was screen-printed with the above-prepared ultraviolet curable ink composition, and the printed paper was irradiated with a 5.6 KW high pressure mercury vapor lamp at a height of 15 cm for 10 seconds to give a cured coating layer. Onto the resulting printed paper, the above-prepared ultraviolet curable resin composition was printed as a cover coat, and the cover-coated paper was irradiated with ultraviolet under the same conditions as mentioned above to give a transfer paper for decorating pottery.

The transfer paper thus obtained was transferred onto a pottery by a wet process and was calcined by heating with raising temperature of 100° C./hour upto a miximum temperature of 850° C. As a result, beautiful decoration could be obtained without undesirable cracking or partial disappearance of design. During the calcination, the cover coat was lost at 380° to 450° C.

What is claimed is:

1. An ultraviolet curable resin composition which comprises
    (I) a saturated copolyester having a molecular weight of 2,000 to 15,000 which is soluble in a polymerizable compound (II), 20% to 100% by mole of saturated polycarboxylic acid components of the saturated copolyester being an aromatic dicarboxylic acid, wherein 19 to 98% by mole of the aromatic dicarboxylic acid is terephthalic acid, and the glycol component of the saturated copolyester being 10 to 80% by mole of ethylene glycol and 90 to 20% by mole of an alkylene glycol selected from the group consisting of propylene glycol, butanediol, neopentylglycol and hexanediol;

TABLE 13

| Run. No. | Saturated copoly-ester (I) | Polymerizable compounds (II) (% by weight) | | | | | | Weight ratio of (I)/(II) | Adhesion | Xylene resistance |
| --- | --- | --- | --- | --- | --- | --- | --- | --- | --- | --- |
| | | (a) | | (b) | | (c) | | | | |
| 1 | A | THF—A | 25 | 1,6-HX—A | 25 | BP—4EA | 50 | 30/70 | 100/100 | >100 |
| 2 | A | THF—A | 25 | NPG—A | 25 | BP—4EA | 50 | 35/65 | 100/100 | >100 |
| 3 | A | THF—A | 25 | 1,6-HX—A | 20 | BP—4EA | 55 | 30/70 | 100/100 | >100 |
| 4 | A | THF—A | 25 | TMP—A | 15 | BP—4EA | 60 | 30/70 | 100/100 | >100 |
| 5 | A | THF—A | 25 | TMP—A | 15 | BP—4EA E—A | 50 10 | 35/65 | 100/100 | >100 |
| 6 | A | THF—A | 20 | 1,6-HX—A TMP—A | 20 5 | BP—4EA | 55 | 40/60 | 100/100 | >100 |
| 7 | A | THF—A | 25 | 1,6-HX—A DP—HA | 15 5 | BP—4EA | 55 | 35/65 | 100/100 | >100 |

[Remarks]:
THF—A Tetrahydrofurfuryl acrylate,
1,6-HX—A: 1,6-Hexanediol diacrylate,
NPG—A: Neopentyl glycol diacrylate,
TMP—A: Trimethylolpropane triacrylate,
BP—4EA: Diacrylate of bisphenol A ethylene oxide (4 mole) adduct,
E—A: Epoxyacrylate 3002 (made by Kyoeisha Yushi),
DP—HA: Dipentaerythritol hexaacrylate (II) a polymerizable compound comprising 10 to 95% by weight of a compound having one polymerizable double bond in the molecule selected from the group consisting of (i) a styrene compound, (ii) a substituted or unsubstituted alkyl mono(meth)acrylate, (iii) a mono(meth)acrylate of a bisphenol A alkylene oxide adduct, (iv) a urethane modified mono(meth)acrylate, (v) an epoxy mono(methacrylate) and (vi) an oligo ester of a mono(meth)acrylate and 90 to 5% by weight of a compound having two or more polymerizable double bonds in the molecule selected from the group consisting of (vii) a substituted or unsubstituted alkylene glycol di(meth)acrylate, (viii) a di(meth)acrylate of a bisphenol A alkylene oxide adduct, (ix) a urethane modified di(meth)acrylate, (x) an epoxy di(meth)acrylate, (xi) an oligo ester of a di(meth)acrylate, (xii) a poly(meth)acrylate of a polyvalent aliphate alcohol having three or more hydroxyl groups, and (xiii) a urethane modified poly(meth)acrylate, and
(III) a photosensitizer.

2. An ultraviolet curable resin composition according to claim 1, wherein the saturated copolyester (I) and the polymerizable compound (II) are incorporated in the weight ratio of 10:90 to 80:20.

3. An ultraviolet curable resin composition according to claim 1, wherein the photosensitizer (III) is incorporated in an amount of 0.05 to 20% by weight based on the total weight of the saturated copolyester (I) and the polymerizable compound (II).

4. An ultraviolet curable resin composition according to claim 1, wherein the saturated polycarboxylic acid components of the saturated copolyester (I) comprise 20 to 70% by mole of terephthalic acid and 80 to 30% by mole of isophthalic acid.

5. An ultraviolet curable resin composition according to claim 1, wherein the saturated polycarboxylic acid components of the saturated copolyester (I) comprise 20 to 70% mole of terephthalic acid and 80 to 30% by mole of an aliphatic dicarboxylic acid having 3 to 30 carbon atoms.

6. An ultraviolet curable resin composition according to claim 1, wherein the saturated polycarboxylic acid components of the saturated copolyester (I) comprise 19 to 98% by mole of terephthalic acid, 1 to 80% by mole of isophthalic acid and 80 to 1% by mole of an aliphatic dicarboxylic acid having 3 to 30 carbon atoms.

7. An ultraviolet curable resin composition according to claim 1, wherein the polyol components of the saturated copolyester (I) comprise 10 to 80% by mole of ethylene glycol and 90 to 20% by mole of an alkylene glycol selected from the group consisting of propylene glycol, butanediol, neopentyl glycol and hexanediol.

8. An ultraviolet curable resin composition according to claim 1, wherein the polyol components of the saturated copolyester (I) comprise 10 to 90% by mole of butanediol and 90 to 10% by mole of an alkylene glycol selected from the group consisting of propylene glycol, neopentyl glycol and hexanediol.

9. An ultraviolet curable resin composition according to claim 1, wherein the saturated polycarboxylic acid components of the saturated copolyester (I) contain 0.5 to 20% by mole of an aromatic dicarboxylic acid having a metal sulfonate group.

10. An ultraviolet curable resin composition according to claim 1, wherein the compound having one polymerizable double bond in the molecule is a member selected from phenoxyehtyl methacrylate and tetrahydrofurfuryl acrylate.

11. An ultraviolet curable resin composition accoring to claim 1, wherein the polymerizable compound (II) comprises (a) 10 to 70% by weight of a mono(meth)acrylate, (b) 5 to 50% by weight of one or more poly(meth)acrylate selected from the group consisting of a two or more poly(meth)acrylate having a molecular weight of smaller than 500, dipentaerythritol penta(meth)acrylate and dipentaerythritol hexa(meth)acrylate, and (c) 20 to 70% by weight of di(meth)acrylate having a molecular weight of larger than 500.

12. An ultraviolet curable resin composition according to claim 1, wherein the photosensitizer (III) is a member selected from the group consisting of benzoins, anthraquinones, benzophenones, sulfur-containing compounds and pigments.

13. An ultraviolet curable resin composition according to claim 1, wherein the photosensitizer (III) is a member selected from the group consisting of xanthone, thioxanthone and their derivatives.

14. An ultraviolet curable resin composition according to claim 1, wherein the photosensitizer (III) is a compound of the formula:

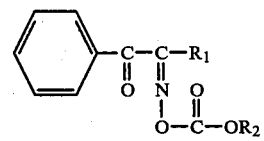

wherein $R_1$ and $R_2$ are each a hydrocarbon group having 1 to 10 carbon atoms.

15. An ultraviolet curable resin composition according to claim 1, wherein the photosensitizer (III) is a combination of (a) a member selected from the group consisting of xanthone, thioxanthone and their derivaties, and (b) a compound of the formula:

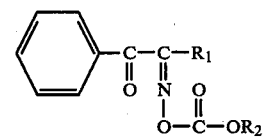

wherein $R_1$ and $R_2$ are each a hydrocarbon group having 1 to 10 carbon atoms in the weight ratio of 4/1 to 1/4.

16. An ultraviolet curable resin composition according to claim 1, which is incorporated with one or more pigments suitable for screen printing or decorating potteries.

17. An ultraviolet curable resin composition according to claim 1, wherein the polymerizable compound (II) comprises 10 to 95% by weight of a compound selected from the group consisting of phenoxyethyl(meth)acrylate and tetrahydrofurfuryl(meth)acrylate and 90 to 5% by weight of a compound selected from the group consisting of a two or more poly(meth)acrylate having a molecular weight of smaller than 500, di(meth)acrylate of disphenol A ethylene oxide adduct, di(meth)acrylate of bisphenol A propylene oxide adduct, and dipentaerythritol hexa(meth)acrylate.

18. An ultraviolet curable resin composition according to claim 1, wherein the compound having one polymerizable double bond in the molecule is a member selected from the group consisting of (ii) a substituted or unsubstituted alkyl mono(meth)acrylate, (v) an epoxy mono(meth)acrylate, and (vi) an oligo ester of a mono(meth)acrylate.

19. An ultraviolet curable resin composition according to claim 18, wherein the compound having one polymerizable double bond is (ii) a substituted or unsubstituted alkyl mono(meth)acrylate.

20. An ultraviolet curable resin composition according to claim 1, wherein the compound having two or more polymerizable double bonds in the molecule is a member selected from the group consisting of (i) a substituted or unsubstituted alkylene glycol di(meth)acrylate, (ii) a di(meth)acrylate of bisphenol A alkylene oxide adduct, (iv) an epoxy di(meth)acrylate, and (vi) a poly(meth)acrylate of an at least trivalent aliphatic alcohol.

21. In a method of preparing laminated products the improvement which comprises employing as an adhesive a composition which comprises:

(I) a saturated copolyester having a molecular weight of 2,000 to 15,000 which is soluble in a polymerizable compound (II), 20% to 100% by mole of saturated polycarboxylic acid components of the saturated copolyester being an aromatic dicarboxylic acid, wherein 19 to 98% by mole of the aromatic dicarboxylic acid is terephthalic acid, and the glycol component of the saturated copolyester being 10 to 80% by mole of ethylene glycol and 90 to 20% by mole of an alkylene glycol selected from the group consisting of propylene glycol, butanediol, neopentylgylcol and hexanediol;

(II) a polymerizable compound comprising 10 to 95% by weight of a compound having one polymerizable double bond in the molecule selected from the group consisting of (i) a styrene compound, (ii) a substituted or unsubstituted alkyl mono(meth)acrylate, (iii) a mono(meth)acrylate of a bisphenol A alkylene oxide adduct, (iv) a urethane modified mono(meth)acrylate, (v) an epoxy mono(methacrylate) and (vi) an oligo ester of a mono(meth)acrylate and 90 to 5% by weight of a compound having two or more polymerizable double bonds in the molecule selected from the group consisting of (vii) a substituted or unsubstituted alkylene glycol di(meth)acrylate, (viii) a di(meth)acrylate of a bisphenol A alkylene oxide adduct, (ix) a urethane modified di(meth)acrylate, (x) an epoxy di(meth)acrylate, (xi) an oligo ester of a di(meth)acrylate, (xii) a poly(meth)acrylate of a polyvalent aliphate alcohol having three or more hydroxyl groups, and (xiii) a urethane modified poly(meth)acrylate, and (III) a photosensitizer.

22. The method of claim 21 wherein the polymerizable compound (II) comprises 10 to 95% by weight of a compound selected from the group consisting of phenoxyethyl(meth)acrylate and tetrahydrofurfuryl(meth)acrylate and 90 to 5% by weight of a compound selected from the group consisting of a two or more poly(meth)acrylate having a molecular weight of smaller than 500, di(meth)acrylate of disphenol A ethylene oxide adduct, di(meth)acrylate of bisphenol A propylene oxide adduct, and dipentaerythritol hexa(meth)acrylate.

* * * * *